US010954848B2

United States Patent
Lee et al.

(10) Patent No.: US 10,954,848 B2
(45) Date of Patent: Mar. 23, 2021

(54) ROTARY ENGINE

(71) Applicant: LG Electronics Inc., Seoul (KR)

(72) Inventors: Yunhi Lee, Seoul (KR); Byeonghun Yu, Seoul (KR); Wheesung Oh, Seoul (KR); Byeongchul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 15/983,712

(22) Filed: May 18, 2018

(65) Prior Publication Data
US 2018/0334955 A1 Nov. 22, 2018

(30) Foreign Application Priority Data

May 22, 2017 (KR) ........................ 10-2017-0063123

(51) Int. Cl.
| *F02B 55/08* | (2006.01) |
| *F02B 55/02* | (2006.01) |
| *F01C 1/10* | (2006.01) |
| *F01C 21/00* | (2006.01) |
| *F02B 55/14* | (2006.01) |

(52) U.S. Cl.
CPC ............... *F02B 55/08* (2013.01); *F01C 1/10* (2013.01); *F01C 21/008* (2013.01); *F02B 55/02* (2013.01); *F02B 55/14* (2013.01); *F04C 2230/60* (2013.01); *F04C 2240/60* (2013.01)

(58) Field of Classification Search
CPC .. F02B 55/08; F02B 55/14; F01C 1/10; F01C 21/008; F04C 2240/60
See application file for complete search history.

(56) References Cited

U.S. PATENT DOCUMENTS

| 4,973,233 A | 11/1990 | Kurio et al. |
| 8,523,546 B2 * | 9/2013 | Shkolnik ............... F01C 21/106 418/61.2 |
| 2011/0174261 A1 | 7/2011 | Havskjold et al. |

FOREIGN PATENT DOCUMENTS

| EP | 2628951 A1 * | 8/2013 | .............. F01C 20/14 |
| KR | 2019970049874 | 8/1997 | |
| KR | 1020090103772 | 10/2009 | |
| KR | 20140022029 A | 2/2014 | |
| KR | 1020140022029 | 2/2014 | |

* cited by examiner

Primary Examiner — Audrey K Bradley
(74) Attorney, Agent, or Firm — Fish & Richardson P.C.

(57) ABSTRACT

The present disclosure relates to a rotary engine having a crankshaft with an improved structure, the rotary engine including a housing, a rotor, housing covers, and a crankshaft installed to penetrate through the rotor so as to receive rotational force from the rotor, wherein the crankshaft includes a first member extending in one direction and having an insertion groove recessed in one side surface thereof, a second member extending to penetrate through a center portion of the housing and provided with a protruding portion on one end thereof to be fixedly inserted into the insertion groove, and a coupling member interposed at a position where the insertion groove and the protruding portion overlap each other such that the first member and the second member are closely coupled to each other.

19 Claims, 9 Drawing Sheets

ROTARY ENGINE

CROSS-REFERENCE TO RELATED APPLICATION

Pursuant to 35 USC § 119 (a), this application claims the benefit of an earlier filing date and priority to Korean Application No. 10-2017-0063123, filed on May 22, 2017, the contents of which are incorporated by reference herein in its entirety.

BACKGROUND

1. Field

The present disclosure relates to a rotary engine that produces power by a rotational motion.

2. Description of the Related Art

A rotary engine is an engine that produces power by a rotational motion and has been originally designed by Wankel.

The Wankel engine designed by Wankel includes a housing having an inner surface with an epitrochoid-shaped curve, and a triangular rotor rotating within the housing. An inner space of the housing is divided into three spaces by the rotor, and four strokes of suction→compression→explosion→exhaust are continuously carried out in response to volumes of those spaces being changed according to the rotation of the rotor. In the Wankel engine, each stroke is performed three times while the rotor rotates once, and an eccentric shaft rotates three times.

Since the Wankel engine is designed, various studies have been made to optimize the design of the Wankel engine, and a rotary engine in a modified form is also being developed. Such rotary engine is disclosed in Korean Patent Laid-Open Publication No. 10-2014-0022029 (published on Feb. 21, 2014).

The rotary engine is a high power engine that can be easily miniaturized owing to its simple structure and produce high output in a high speed operation. Because of these features, the rotary engine has advantages of being applicable to various devices such as heat pump systems, automobiles, bicycles, aircrafts, jet skis, chain saws, drones and the like. In addition, the rotary engine has advantages of less vibration and noise resulting from uniform rotational force and reduced NOx.

However, the rotary engine has a large surface area relative to a stroke volume, and thereby an anti-inflammatory area is increased, which causes a large amount of unburned hydrocarbons (UHC) discharged and low fuel efficiency.

On the other hand, the inner space of the housing divided by the rotor has to be sealed from outside of the rotary engine or between the divided spaces. Further, a movement of the rotor which is accommodated in a lobe accommodating portion is caused by the rotation of the crankshaft, and stable movement of the crankshaft is essential during each stroke of suction, compression, explosion, and exhaust.

The rotor is coupled to the crankshaft. When the crankshaft behaves in a radial direction during rotation, the rotor is brought into contact with housing covers located on both sides. When the rotor and the housing covers are abraded with each other in contact with each other, durability of the rotor is adversely affected and the housing covers and the rotor are deformed.

Particularly, the crankshaft is provided with an eccentric portion to which the rotor is coupled. Since the rotor is coupled to the eccentric portion and rotates at high speed, a way of reducing the abrasion of the rotor by reducing the shaft deformation of the crankshaft is required.

Therefore, a structural change of the crankshaft to prevent unnecessary abrasion of the rotor by limiting a contact between the rotor and the housing covers while allowing stable movement of the rotor coupled to the eccentric portion may be taken into account.

SUMMARY

One aspect of the present disclosure is to provide a structure of a rotary engine capable of preventing unnecessary contact between a rotor and housing covers by varying a structure of a crankshaft.

Another object of the present disclosure is to provide a structure of a rotary engine capable of minimizing a radial movement of a crankshaft by changing a structure of the crankshaft such that the crankshaft is configured by two members.

Another object of the present disclosure is to provide a structure of a rotary engine capable of minimizing a movement occurring at a contact surface between both of first and second members of a crankshaft even when the crankshaft rotates at high speed in a manner that the first member and the second member are tightly coupled to each other.

To achieve these and other advantages and in accordance with the purpose of the present disclosure, as embodied and broadly described herein, there is provided a rotary engine, including a housing, N lobe accommodating portions (N is a natural number equal to or greater than 3), a rotor provided with N−1 lobes accommodated while rotating eccentrically with respect to a center of the housing, housing covers, and a crankshaft receiving rotational force from the rotor. The crankshaft may be configured such that a protruding portion of a second member is inserted into an insertion groove of a first member, and may be provided with a coupling member interposed at a position where the insertion groove and the protruding portion overlap each other such that the first member and the second member are closely coupled to each other. Thus, an abnormal behavior of the crankshaft provided with the first and second members can be restricted so as to prevent the contact between the rotor and inner surfaces of the housing covers.

The rotary engine may further include a bushing having a shape corresponding to an inner surface of the insertion groove and inserted into the insertion groove so as to be located between the protruding portion and the insertion groove. Therefore, a spacing generated between coupled surfaces of the first member and the second member can be reduced, thereby preventing unstable movement of the crankshaft.

According to the present disclosure constituted by the solution described above, the following effects can be obtained.

According to the rotary engine having the above-described structure, the crankshaft can make stable movement even if rotating at high speed, and left and right movements of the rotor coupled to the eccentric portion of the crankshaft can be restricted, thereby preventing the rotor from being brought into contact with the housing covers disposed at both sides thereof. Thus, abrasion and deformation of the rotor can be reduced, and damage on the housing covers due to the contact with the rotor can be prevented, thereby improving durability of the rotary engine.

By the coupling of the first member and the second member, the movement of the crankshaft can be restricted along an axial direction even when the crankshaft rotates at high speed. Therefore, the contact between the rotor and the housing covers does not occur, and the durability of the rotary engine can be improved.

Further, the first member and the second member can be more tightly coupled to each other by the structure of the crankshaft in which the protruding portion of the second member is inserted into the insertion groove of the first member and the coupling member is interposed between the insertion groove and the protruding portion, and a movement of the crankshaft generated between contact surfaces of the both members can be minimized even while the crankshaft rotates at high speed, so as to allow a smooth movement of the rotor coupled to the crankshaft.

DETAILED DESCRIPTION OF THE PREFERRED EMBODIMENT

Hereinafter, a rotary engine according to the present disclosure will be described in detail with reference to the drawings.

A singular representation may include a plural representation unless it represents a definitely different meaning from the context.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1:
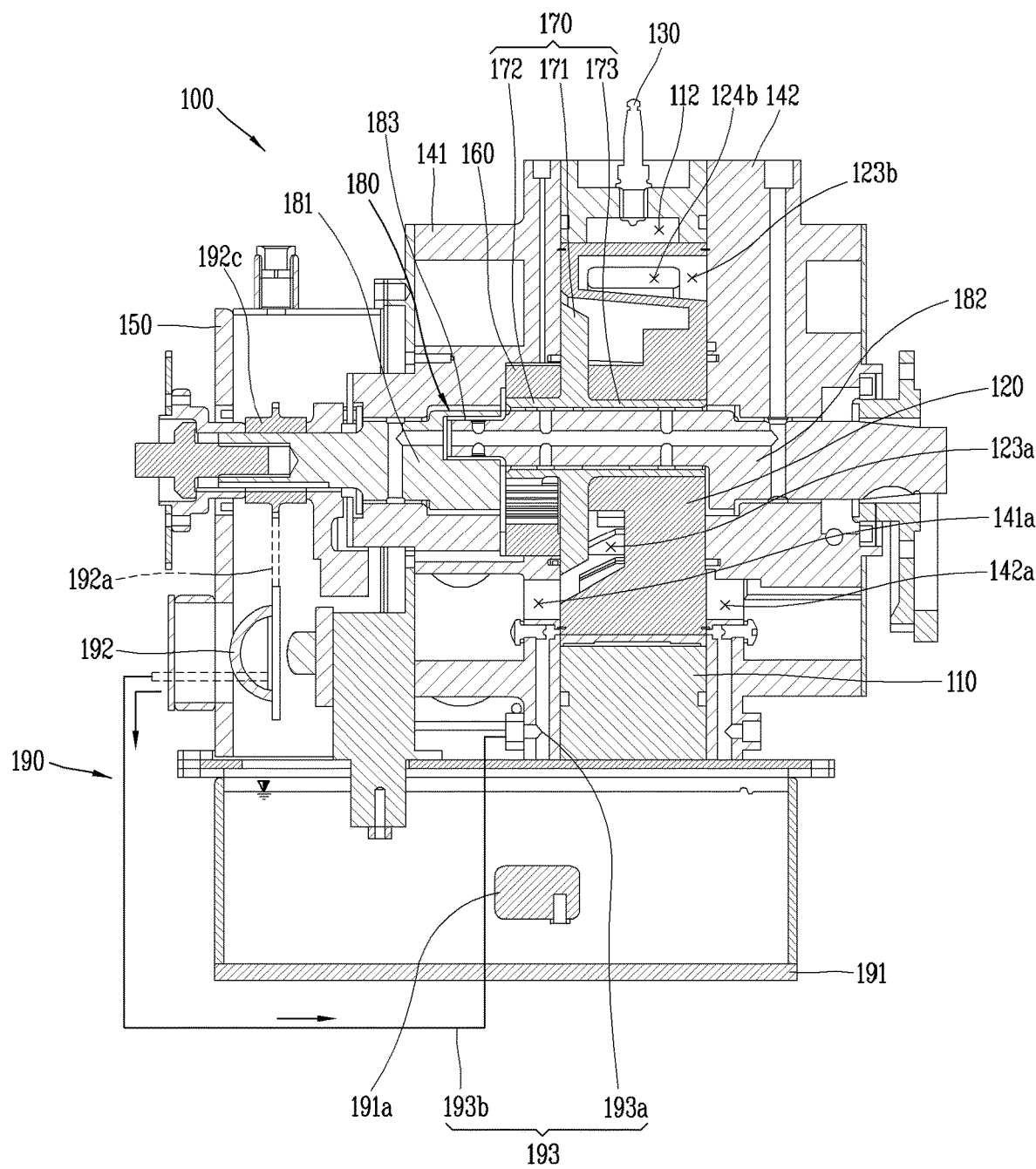
FIG. 1 is a longitudinal sectional view of a rotary engine according to the present disclosure.
Figure 2:
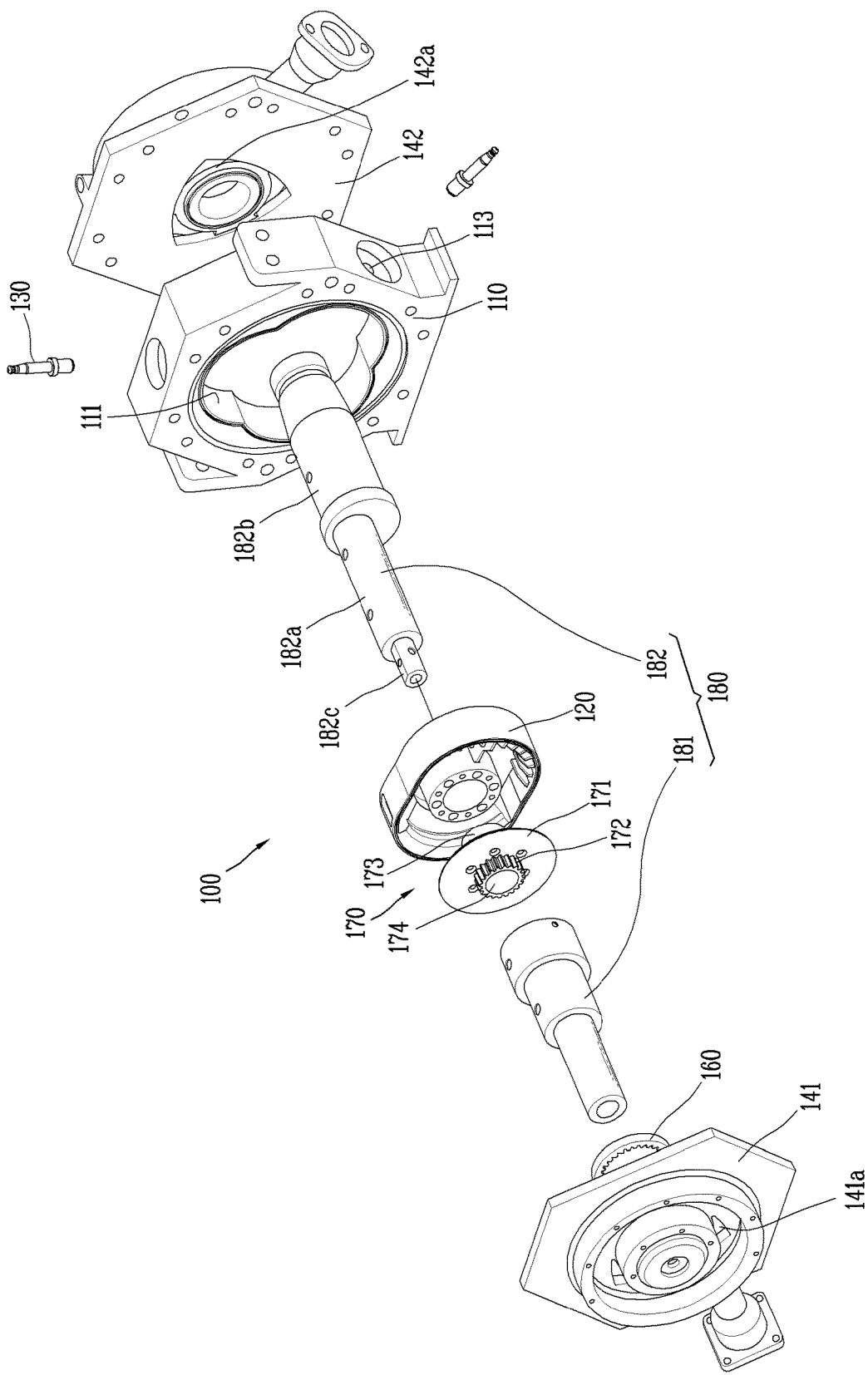
FIG. 2 is an exploded perspective view illustrating some components of the rotary engine illustrated in FIG. 1.

FIG. 1 is a longitudinal sectional view of a rotary engine according to the present disclosure, and FIG. 2 is an exploded perspective view illustrating some components of the rotary engine illustrated in FIG. 1.

A rotary engine 100 according to the present disclosure is configured such that volumes of N operating chambers formed between a housing 110 and a rotor 120 change in response to the rotor 120 eccentrically rotating within the housing 110. During this process, four strokes of intake-compression-explosion-exhaust are continuously carried out. A crankshaft 180 rotates in response to the eccentric rotation of the rotor 120 and is connected to other components so as to transfer produced power.

The rotary engine 100 of the present disclosure includes a housing 110, ignition plugs 130, a rotor 120, housing covers 141 and 142, a rotor gear 170, and a crankshaft 180.

First, the housing 110 is provided therein with N (n is a natural number of 3 or more) lobe accommodating portions 111. In FIG. 2, an example in which the number of the lobe accommodating portion 111 is three (that is, N=3) is illustrated. Shapes of the lobe accommodating portion 111 and lobes 120' and 120" to be described later may be designed based on an epitrochoid curve which is a track drawn by an arbitrary point existing on a rolling circle in response to a rotation of the rolling circle when the rolling circle moving while rotating on an arbitrary shape is present.

In an upper center of each lobe accommodating portion 111, N combustion chambers 112 communicating with the lobe accommodating portions 111 are provided. Each combustion chamber 112 has a recessed shape at an inner wall of the housing 110 forming the lobe accommodating portion 111. A size of the combustion chamber 112 may be designed differently depending on a compression ratio of the rotary engine 100.

The housing 110 may be provided with ignition plugs 130 for discharging a flame to the respective combustion chambers 112 to ignite a mixture filled in the respective combustion chambers 112.

The ignition plugs 130 may be mounted to mounting holes 113 of the housing 110 and each ignition plug 130 may be disposed to be exposed at an upper portion of the combustion chamber 112. The mounting holes 113 are configured to communicate with the combustion chambers 112, respectively.

Meanwhile, the rotor 120 is inserted into the lobe accommodating portions 111 to rotate eccentrically with respect to centers of the lobe accommodating portions 111. The rotor 120 is provided with N−1 lobes 120' and 120" that are continuously accommodated in the respective lobe accommodating portions 111 during the eccentric rotation.

Figure 3:
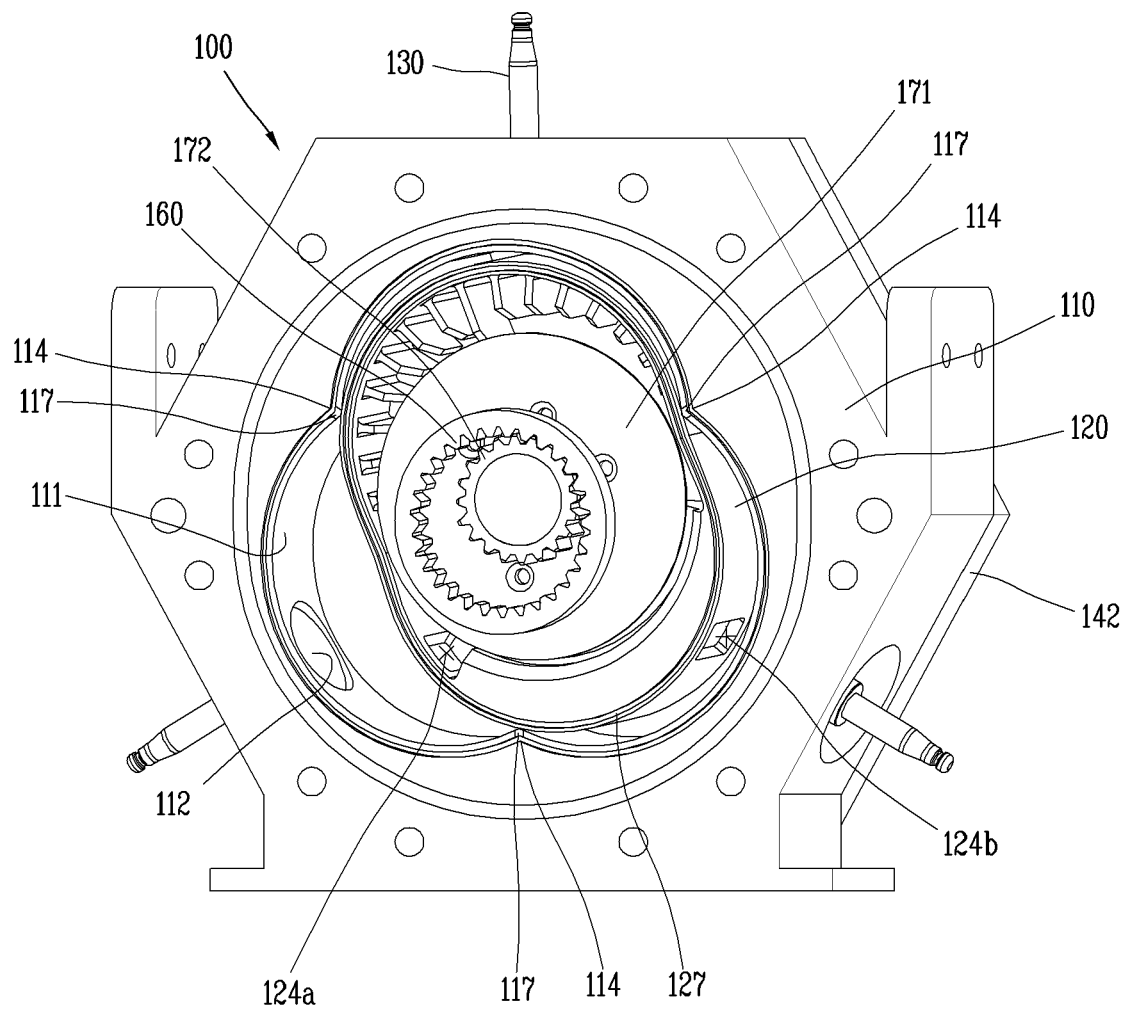
FIG. 3 is a conceptual view illustrating an internal structure of the rotary engine illustrated in FIG. 1.
Figure 4A:
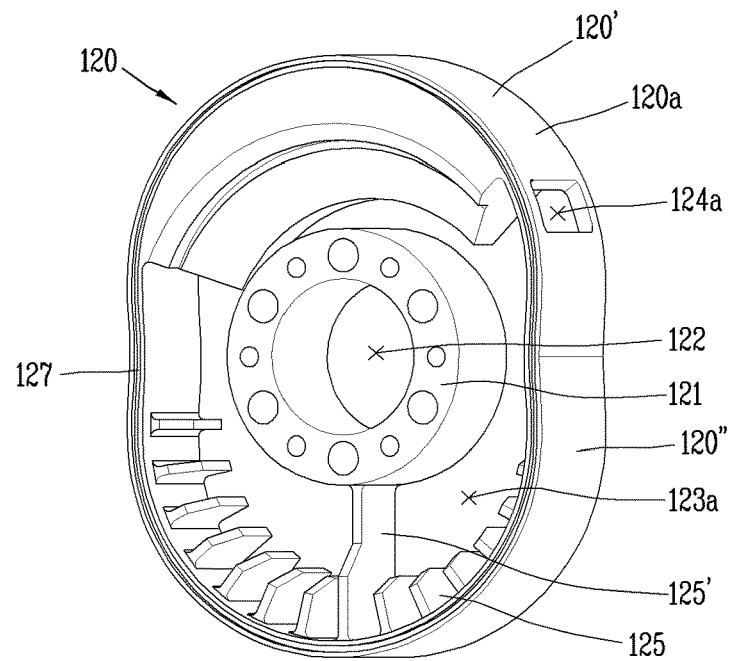
FIGS. 4A and 4B are perspective views of a rotor illustrated in FIG. 1, viewed from different directions.
Figure 4B:
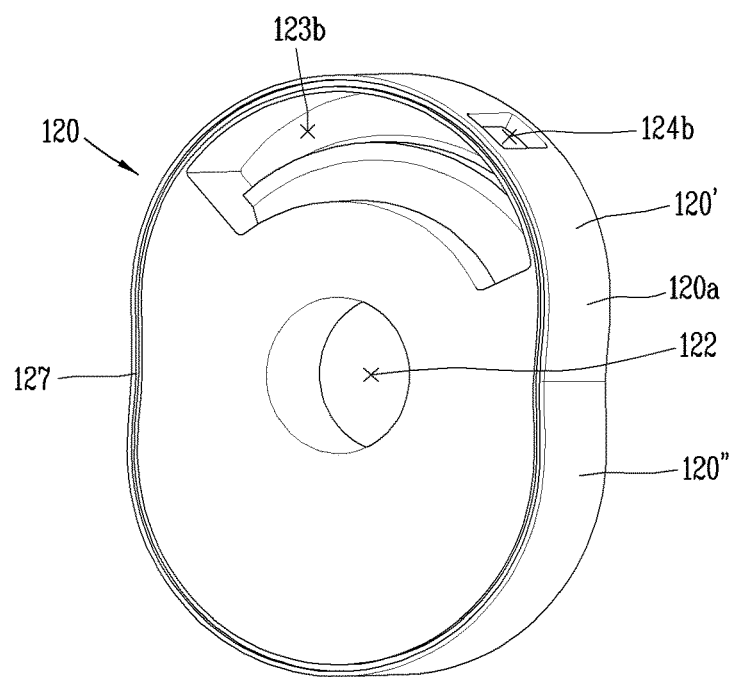

FIG. 3 is a conceptual view illustrating an internal structure of the rotary engine 100 illustrated in FIG. 1, and FIGS. 4A and 4B are perspective views of the rotor 120 illustrated in FIG. 1, viewed from different directions.

Referring to FIGS. 4A and 4B, the rotor 120 is provided at its center with a supporting portion 121 to which a rotor gear 170 is mounted. The supporting portion 121 is provided with a through hole 122 through which a crankshaft 180 inserted into the rotor gear 170 passes. A flange portion 171 of the rotor gear 170 is supported on a front surface of the supporting portion 121 and is firmly coupled to the supporting portion 121 by coupling means such as coupling members and the like.

A first storage portion 123a for temporarily storing a mixture sucked through an intake-side cover 141, which is one of the housing covers, is formed in a front portion of the rotor 120. The first storage portion 123a has a recessed shape from the front portion to a rear portion of the rotor 120 (i.e., in an axial direction of the crankshaft 180).

As the first storage portion 123a is formed, one portion of the rotor 120 (as illustrated, a portion of the first storage portion 123a which does not share a side wall with a second storage portion 123b) remains thin at an edge thereof, which may cause rigidity of the portion to be lowered. In this regard, ribs 125 for reinforcing rigidity of the rotor 120 and serving as cooling fins may protrude at a plurality of locations from an inner side surface of the rotor 120, which forms the first storage portion 123a. At this time, at least one rib 125' may be connected to the supporting portion 121 and may have a portion with a height lower than a thickness of the rotor 120 so that the mixture temporarily stored in the first storage portion 123a can flow to an opposite side.

An intake port 124a communicating with the first storage portion 123a is formed through a side surface of the rotor 120 so that a sucked mixture can be introduced into the lobe accommodating portion 111. In the present disclosure, the intake port 124a is formed at a position where the mixture can be sucked while the rotor 120 rotates by 90° to 120° in a counterclockwise direction.

A second storage portion 123b for temporarily storing exhaust gas generated after the combustion is formed in a rear portion of the rotor 120. The second storage portion 123b has a recessed shape from the rear to front portions of the rotor 120 (i.e., in the axial direction of the crankshaft 180). The exhaust gas temporarily stored in the second storage portion 123b is exhausted to outside through an exhaust-side cover 142 which is another one of the housing covers.

An exhaust port 124b communicating with the second storage portion 123b is formed through a side surface of the rotor 120 so that the exhaust gas generated after the combustion can flow into the second storage portion 123b. In the present disclosure, the exhaust port 124b is formed at a position where exhaust gas can be discharged after the rotor 120 is rotated by 270° in the counterclockwise direction so that the exhaust gas can be discharged after expanded to be larger than an introduced amount. This over-expansion can increase the efficiency of the rotary engine 100.

As illustrated in FIGS. 1 and 2, the intake-side cover 141 is provided on the front portion of the housing 110 and the exhaust-side cover 142 is provided on the rear portion of the housing 110.

The intake-side cover 141 is coupled to the housing 110 so as to cover one side of each lobe accommodating portion 111. A sealing component (not illustrated) for maintaining airtightness between the housing 110 and the rotor 120 is provided on the intake-side cover 141.

The intake-side cover 141 serves as a path for transmitting the sucked mixture to the rotor 120 while sealing the housing 110. To this end, the intake-side cover 141 is provided with an intake hole 141a communicating with the first storage portion 123a, which is provided in the front portion of the rotor 120.

Also, an oil storage cover 150 may be further mounted on the intake-side cover 141 of the rotary engine and an oil pump 192 may be provided between the oil storage cover 150 and the intake-side cover 141. The oil pump 192 is connected to a chain gear portion (not illustrated) of the crankshaft 180 by a chain member 192a and is operated by the generated power to circulate oil for lubrication.

The rotary engine 100 of the present disclosure may further include a lubrication unit 190. The lubrication unit 190 includes an oil pan 191, an oil pump 192, and an oil supply passage 193. These components serve to store and pump the oil and supply it to the friction part.

The oil storage cover 150 may be coupled to the intake-side cover 141. The intake hole 141a may be formed on the rear surface of the intake-side cover 141 coupled toward the rotor 120 and the oil pump 192 may be mounted on an opposite side of the intake hole 141a.

The oil storage cover 150 covers the front surface of the intake-side cover 141 to accommodate the oil pump 192. The oil pan 191 may communicate with a lower surface of a space, which is formed by the oil storage cover 150 and the intake-side cover 141 such that oil can be filled in the space.

The oil pan 191 and the oil pump 192 may be connected to each other by a pipe or a tube (not illustrated) through which oil is pumped up. An oil strainer (not illustrated) for filtering oil may further be provided at an end portion of the pipe or tube in a manner of being suck in the oil pan 191.

The oil pump 192 may be, for example, a trochoid pump that sucks oil by an eccentric rotation of a rotating body. The oil pump 192 may be arranged to rotate in parallel with respect to the crankshaft 180. A chain gear 183 may be mounted on an outer circumferential surface of the crankshaft 180, and the trochoid pump and the crankshaft 180 may be connected to each other by a chain member 192a. Accordingly, rotational force generated in the crankshaft 180 can be transmitted to the trochoid pump according to the operation of the rotary engine 100 of the present disclosure.

The oil supply passage 193 may be connected in a manner that the oil pumped up by the oil pump 192 is supplied to each component.

The lubrication unit 190 operates in a manner that an operation of the oil pump 192 is started in response to driving force being generated in the crankshaft 180 and the oil filled in the oil pan 191 flows along the oil supply passage 193 to lubricate each component.

On the other hand, the oil pump 192 may operate in cooperation with the crankshaft 180 by the chain member 192a. As a result, the oil pump 192 can be operated without a requirement for separate driving means. In addition, as an output of the engine is increased, the oil pump can vary to increase an oil supply, thereby implementing a lubrication effect which is variable to correspond to the output of the engine.

The oil supply passage 193 may include a housing passage 193a and a supply tube 193b. The housing passage 193a is a passage penetrating through the housing covers 141 and 142, and the supply tube 193b has a shape of an external passage formed at the outside of the housing 110 and the housing covers 141 and 142.

The supply tube 193b may be formed at the outside the housing and the housing covers 141 and 142 so as to communicate the oil pump 192 and the housing passage 193a with each other. That is, one end portion of the supply tube 193b may be connected to a discharge end portion of the oil pump 192, and another end portion thereof may be connected to a portion of the housing passage 193a which is exposed to the outside of the housing covers 141 and 142.

As described above, since the oil supply passage 193 is formed by the combination of the housing passage 193a and the supply tube 193b, the oil can be supplied along a separate passage without using the flow of the mixture.

A guide gear 160 is mounted on an inside of the intake-side cover 141 facing the lobe accommodating portion 111. The guide gear 160 is formed in a ring shape having teeth formed along an inner circumference thereof, and a rotor gear 170 is rotated with being engaged with the guide gear 160. This results in guiding the eccentric rotation of the rotor with respect to the center of the lobe accommodating portion 111. The number of teeth of the guide gear 160 is designed in consideration of a rotation ratio of the rotor 120 and the crankshaft 180 transmitting the driving force.

The rotor 120 is provided with the rotor gear 170. Teeth are formed along an outer circumference of the rotor gear 170 and the rotor gear 170 is rotated with being engaged with the guide gear 160 fixed to the intake-side cover 141. The number of teeth of the rotor gear 170 is designed in consideration of a rotation ratio of the rotor 120 and the crankshaft 180.

The rotor gear 170 is provided at its center with an accommodating portion 174 into which an eccentric portion 182a of the crankshaft 180 is inserted, and the eccentric portion 182a is rotatable within the accommodating portion 174. With the above configuration, the eccentric portion 182a accommodated in the accommodating portion 174 rotates in response to the eccentric rotation of the rotor 120. Structurally, when the rotor 120 is eccentrically rotated by one turn in the counterclockwise direction, a first member 181 of the crankshaft 180 and a supporting portion 182b of a second member 182 are rotated by N−1 turn in the clockwise direction.

The rotor gear 170 may include the flange portion 171 formed in a shape of a flat plate to be supported and fixed on the supporting portion 121 of the rotor 120, a gear portion 172 formed on one surface of the flange portion 171 and engaged with the guide gear 160, a boss portion 173 protruding from another surface of the flange portion 171 to be inserted into the through hole 122 of the rotor 120 when the flange portion 171 is mounted to the supporting portion 121 of the rotor 120, and the accommodating portion 174 formed through the gear portion 172 and the boss portion 173 such that the eccentric portion 182a of the crankshaft 180 is inserted therein.

The rotary engine 100 serves to transmit the rotational force to a device connected through the crankshaft 180 in response to the eccentric rotation of the rotor 120 located in the lobe accommodating portion 111, and operates four strokes of intake-compression-explosion (expansion)-exhaust for one cycle.

Hereinafter, each stroke of intake-compression-explosion (expansion)-exhaust according to the movement of the rotor 120 in the housing 110 will be schematically described, with reference to FIGS. 1 to 3.

First, the intake stroke is performed by the rotor 120 that rotates counterclockwise inside the housing 110. While a rotation angle of the rotor 120 changes from 0° to 120°, the mixture is introduced into the lobe accommodating portion 111 provided in the upper portion of the housing 110 and the combustion chamber 112 communicating with the lobe accommodating portion 111 through the intake port 124a.

After the intake stroke is completed, the mixture is started to be compressed by the rotation of the rotor 120. The compression stroke is performed while the rotation angle of the rotor 120 changes from 120° to 180°. A compression ratio is maximized when the rotor 120 is rotated by 180°, at which the mixture is ideally fully filled in the combustion chamber 112.

At the end of the compression stroke, ignition by the ignition plug 130 begins, and the combustion stroke of the mixture begins accordingly. The combustion stroke continues until the beginning of the explosion stroke. The combustion stroke starts when the rotation angle of the rotor 120 is about 160° and is completed when the rotation angle of the rotor 120 is about 200°.

On the other hand, as illustrated in FIG. 3, the intake stroke is started in a manner that the mixture is introduced through the intake port 124a into the lobe accommodating portion 111 provided at the left lower end of the housing 110 and the combustion chamber 112 communicating with the lobe accommodating portion 111. That is, the strokes of intake, compression, explosion (expansion), and exhaust are continuously carried out in the lobe accommodating portion 111 corresponding to the rotating direction of the rotor 120 and the combustion chamber 112 communicating with the lobe accommodating portion 111.

The explosion stroke is performed while the rotation angle of the rotor 120 is changed from 180° to 270°. The combustion stroke, which started at the end of the preceding compression stroke, is completely terminated at the beginning of the explosion stroke.

In the previous intake stroke, the intake of the mixture is carried out by a volume corresponding to a state that the rotation angle of the rotor 120 is 120°, that is, a state that the rotor 120 is rotated by 240°. On the other hand, the expansion stroke is carried out until the rotation angle of the rotor 120 is 270° at which a larger volume is formed. Therefore, the rotary engine 100 of the present disclosure can obtain an over-expansion effect that causes the mixture to be expanded larger than the volume of the intake mixture.

The exhaust stroke is performed while the rotation angle of the rotor 120 changes from 270° to 360°. The generated exhaust gas may be discharged through the exhaust port 124b while the rotor 120 rotates counterclockwise from 270° to 360°.

Figure 5:
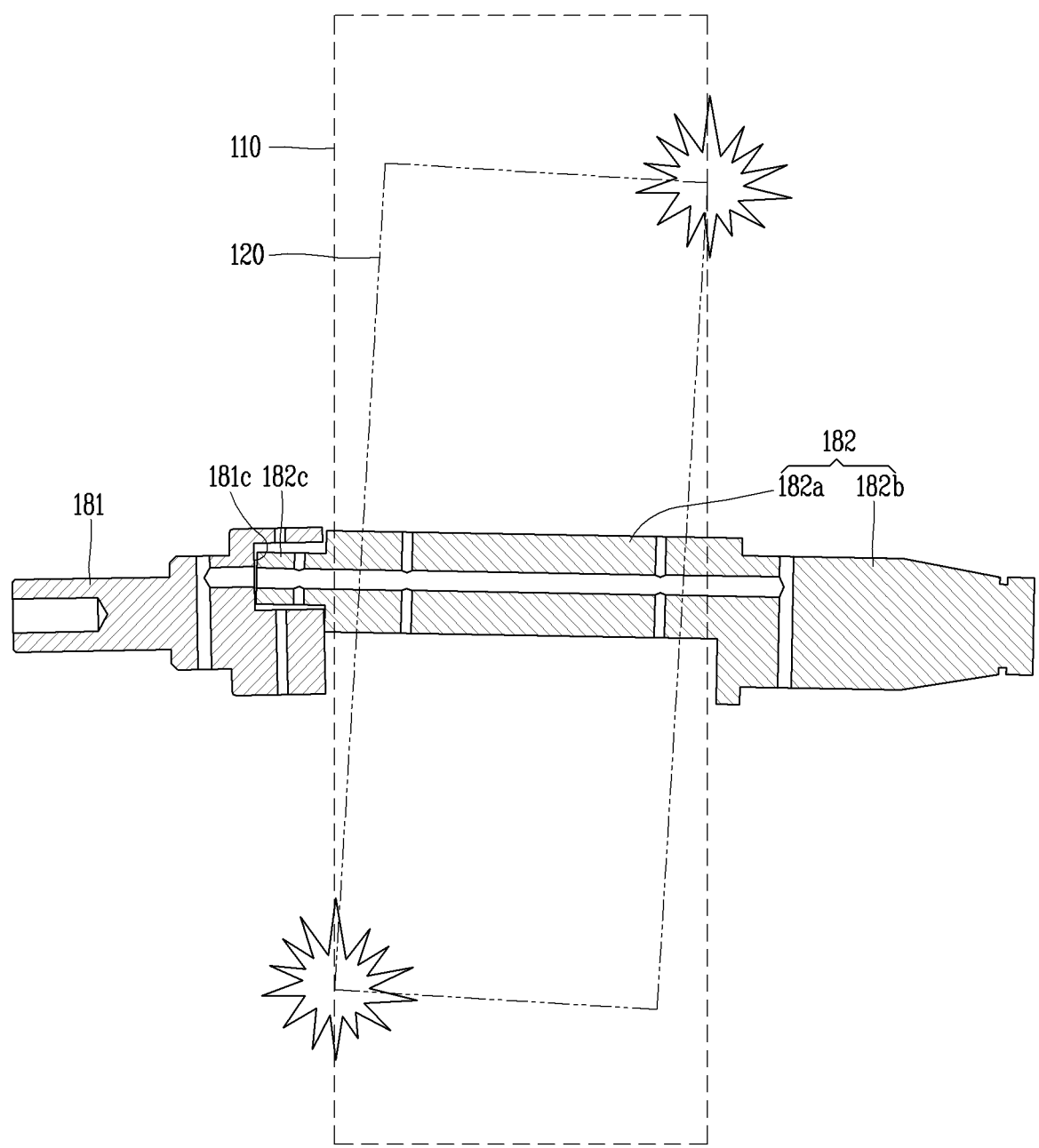
FIG. 5 is a conceptual view illustrating a problem that may arise when a crankshaft of the rotary engine rotates at high speed (rpm)

FIG. 5 is a conceptual view illustrating a problem that may occur when the to crankshaft 180 of the rotary engine 100 rotates at high rpm (revolution per minute).

The rotary engine 100 compresses and expands the mixture by the movement of the rotor 120 and transmits power or driving force through the crankshaft 180. The crankshaft 180 may be configured in such a manner of fixedly coupling the first member 181 and the second member 182 for facilitating assembly and processing. Specifically, the first member 181 and the second member 182 are configured such that a protruding portion 182c of the second member 182 is coupled to an insertion groove 181c recessed into one side surface of the first member 181.

During the operation of each stroke of the rotary engine 100, the crankshaft 180 rotates at approximately 200 to 400 rpm, which causes shaking or vibration of the crankshaft 180 due to a gap between coupled surfaces of the first member 181 and the second member 182 and also causes left and right movements of the rotor 120.

The rotor 120 is accommodated in the housing 110 and the intake-side cover 141 and the exhaust-side cover 142 are coupled to both ends of the housing 110, respectively.

The intake-side cover 141 is coupled to the housing 110 so as to cover one side of each lobe accommodating portion 111. A sealing component (not illustrated) for maintaining airtightness between the housing 110 and the rotor 120 is provided on the intake-side cover 141.

The exhaust-side cover 142 is coupled to the housing 110 so as to cover another side of each lobe accommodating portion 111. The exhaust-side cover 142 seals the housing 110 and serves as a path through which generated exhaust gas is discharged.

The rotor 120 is coupled to the eccentric portion 182a of the second member 182. Accordingly, when a gap is formed between the coupled surfaces of the first member 181 and the second member 182, as illustrated in FIG. 5, the rotor 120 may make the left and right movements, and in this case, the rotor 10 may be brought into contact with inner side surfaces of the intake-side cover 141 and the exhaust-side cover 142.

This may cause abrasion of the rotor 120, which may adversely affect durability of the rotor 120 and cause unnecessary damages on the intake-side cover 141 and the exhaust-side cover 142. Accordingly, introduced air may be likely to be discharged to outside without being sealed while being compressed and discharged.

Figure 6:
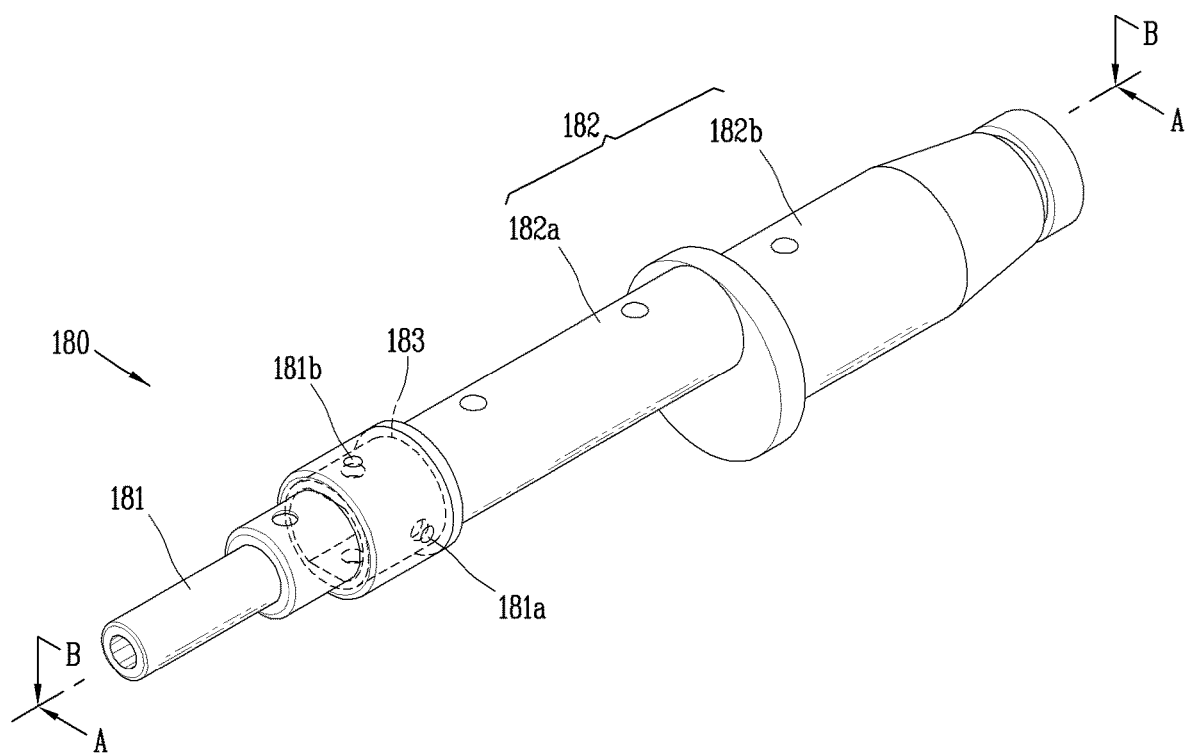
FIG. 6 is a perspective view illustrating a crankshaft of a rotary engine according to the present disclosure.
Figure 7:
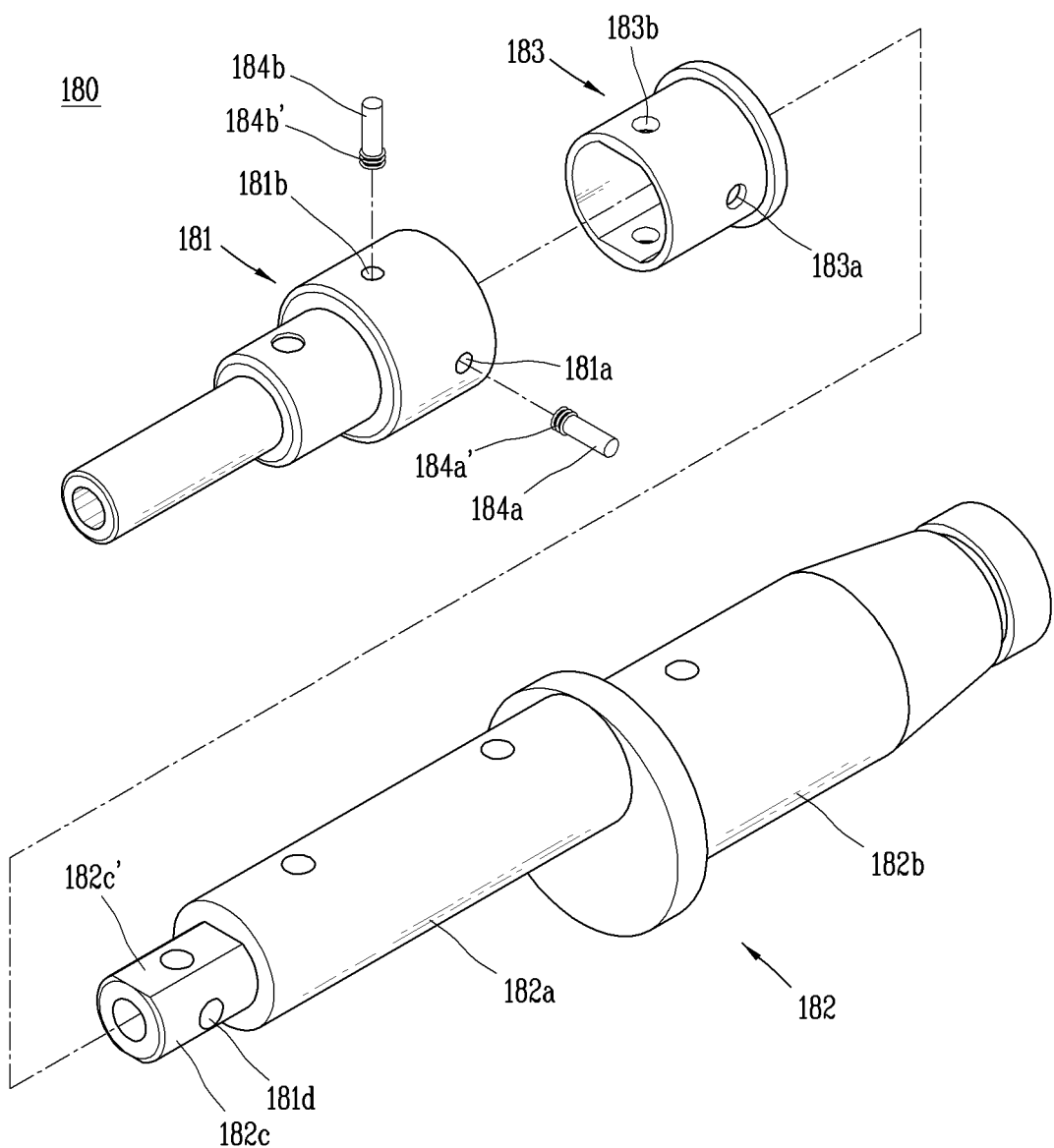
FIG. 7 is an exploded view of the crankshaft of FIG. 6.

FIG. 6 is a perspective view illustrating the crankshaft 180 of the rotary engine 100 according to the present disclosure, and FIG. 7 is an exploded view of the crankshaft 180 of FIG. 6.

The rotary engine 100 of the present disclosure includes the crankshaft 180.

The crankshaft 180 receives rotational force from the rotor 120 and transfers it to a connected device. The crankshaft 180 has a structure in which the first member 181 and the second member 182 are coupled to each other.

The crankshaft 180 includes a shaft portion 181, 182b penetrating through the rotary engine 100, and an eccentric portion 182a formed eccentrically from the shaft portion 181, 182b to be inserted into the accommodating portion 174 of the rotor gear 170. The crankshaft 181, 182b is connected to another system through the shaft portion 181, 182b, so as to transfer the driving force (power) generated in the rotary engine 100 to the another system.

Here, the shaft portion 181, 182b refers to a configuration including the first member 181 and the supporting portion 182b of the second member 182.

The first member 181 is provided with the insertion groove 181c (see FIG. 8A) extending in one direction and recessed from one end surface. The protruding portion 182c of the second member 182 is inserted into the insertion groove 181c and the first member 181 forwardly penetrates through the intake-side cover 141.

A first coupling hole 181a is formed at one side of an outer circumferential surface of the first member 181 so as to communicate with the insertion groove 181c, and a coupling member 184a is inserted into the first coupling hole 181a such that the first member 181 is firmly coupled to the second member 182. Here, the coupling member 184a may refer to a headless bolt.

A support hole 181b is formed at a position spaced apart from the first coupling hole 181a at one side of the outer circumferential surface of the first member 181. A coupling member 184b may be inserted into the support hole 181b and one end of the coupling member 184b may support an outer surface of the protruding portion 182c of the second member 182. Here, the coupling member 184a may refer to a headless bolt.

The first coupling hole 181a and the support hole 181b formed at the outer circumferential surface of the first member 181 may have an angle of about 90° therebetween. As the coupling members 184a and 184b may be inserted into the first coupling hole 181a and the support hole 181b, respectively, such that the first member 181 and the second member 182 can be more tightly coupled to each other with their movements limited.

The second member 182 may extend to penetrate through a center portion of the housing 110 and may extend rearward through the exhaust-side cover 142.

The second member 182 includes the eccentric portion 182a fixedly coupled to the insertion groove 181c, and the supporting portion 182b extending from the eccentric portion 182a to share a central axis with the first member 181.

The protruding portion 182c which is fixedly inserted into the insertion groove 181c of the first member 181 is formed on one end of the eccentric portion 182a. The protruding portion 182c may be formed so that its outer surface has a D-cut shape. A bushing 183, which will be described later, is coupled to a D-cut surface 182c' of the protruding portion 182c.

A second coupling hole 181d is formed on the protruding portion 182c of the second member 182 toward the center portion, and is located to overlap the first coupling hole 184a of the first member 181 when the protruding portion 182c is inserted into the insertion groove 181c. The coupling member 184a inserted through the first coupling hole 181a may be fixedly screwed into the second coupling hole 181d.

The first coupling hole 181a and the second coupling hole 181d may be located at overlapping positions, and may be provided in plurality.

As illustrated in FIG. 7, the crankshaft 180 may further include a bushing 183.

The bushing 183 has a cylindrical shape and an outer surface of the bushing 183 has a shape corresponding to an inner surface of the insertion groove 181c. The bushing 183 is inserted into the insertion groove 181c so as to be located between the protruding portion 182c and the insertion groove 181c.

An inner circumferential surface of the bushing 183 is formed in a D-cut shape so that the protruding portion 182c of the second member 182 is tightly inserted into the bushing 183. Accordingly, relative rotation between the bushing 183 and the first member 181 can be restricted.

The bushing 183 reduces a gap between the first member 181 and the second member 182 and is brought into contact with the outer surface of the protruding portion 182c so as to restrict a movement caused between the coupling surfaces of the first member 181 and the second member 182.

A support hole 183b and a first coupling hole 183a are formed on an outer circumferential surface of the bushing 183, respectively, so as to be located to overlap the support hole 181b and the first coupling hole 181a formed on the first member 181. A screw tap may be formed on an inner surface of the first coupling hole 183a formed on the bushing 183.

Figure 8A:
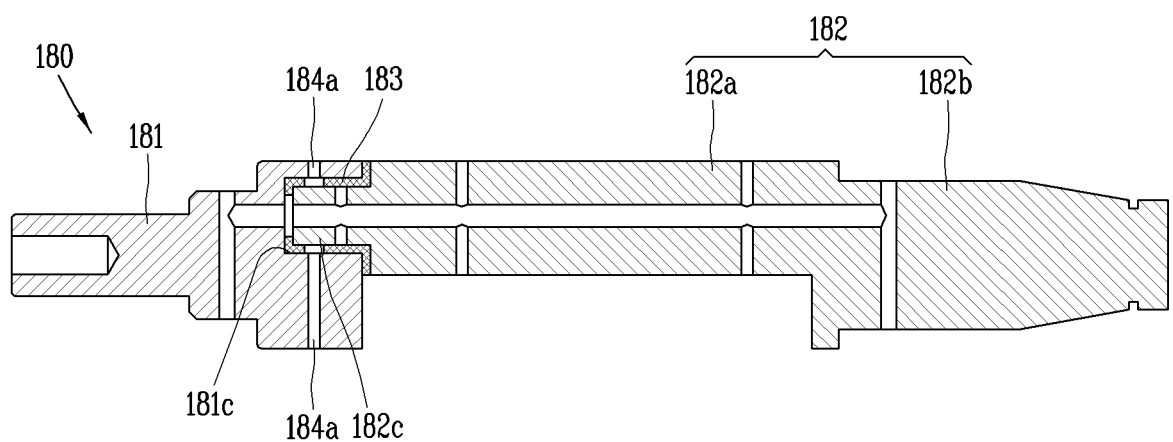
FIG. 8A is a sectional view of the crankshaft of FIG. 6 cut in a direction A.
Figure 8B:
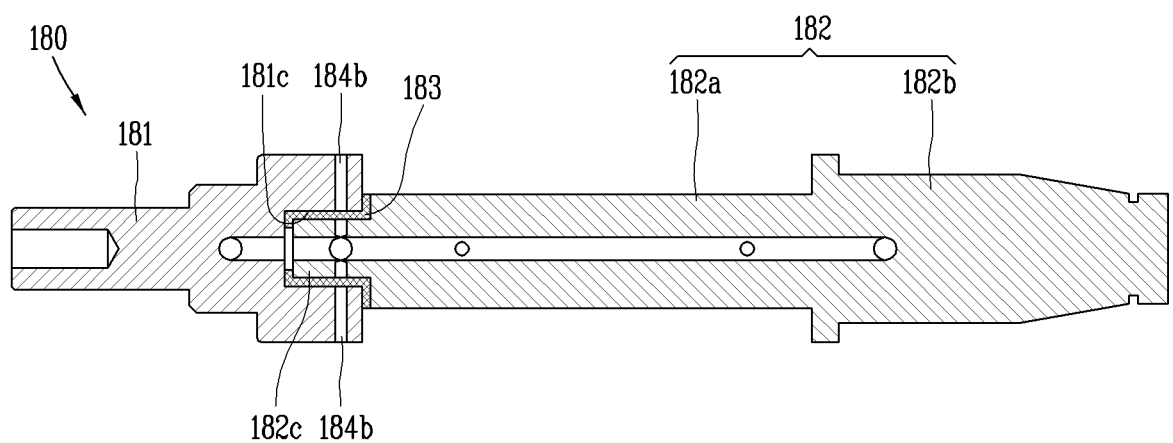
FIG. 8B is a sectional view of the crankshaft of FIG. 6 cut in a direction B.
Figure 9:
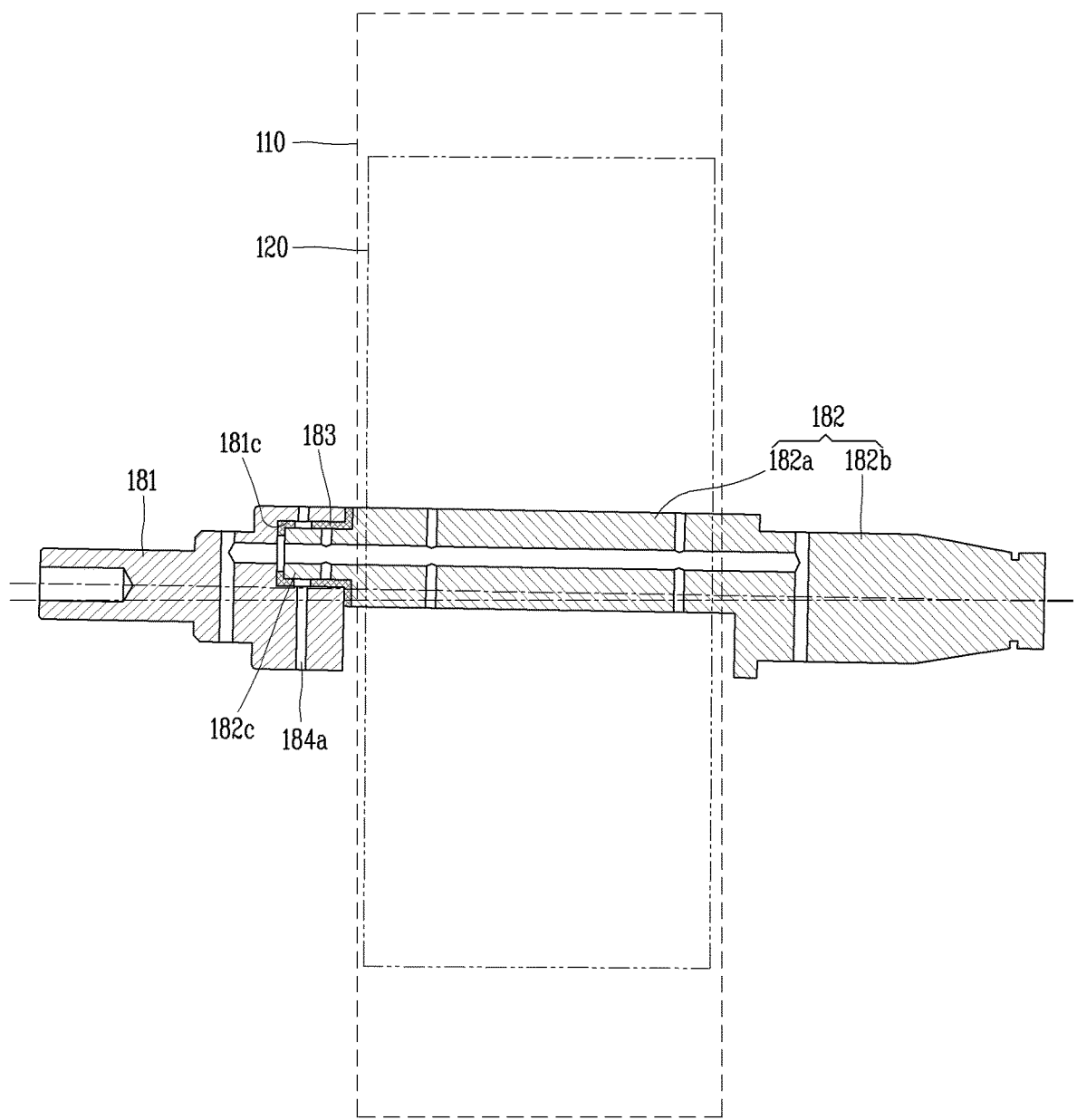
FIG. 9 is a conceptual view illustrating an internal structure of a rotary engine when a crankshaft according to the present disclosure is installed.

FIG. 8A is a sectional view of the crankshaft 180 of FIG. 6 cut in a direction A, and FIG. 8B is a sectional view of the crankshaft 180 of FIG. 6 cut in a direction B. FIG. 9 is a conceptual view illustrating a state of the rotor 120 when the crankshaft 180 according to the present disclosure is installed.

As described above, the crankshaft 180 has the structure in which the bushing 183 is coupled to the insertion groove 181c of the first member 181 and the protruding portion 182c of the second member 182 is inserted into the bushing 183.

The coupling member 184a may be disposed to be inserted into the first coupling hole 181a and the second coupling hole 181d, respectively, and the other coupling member 184b may be inserted into the support hole 181b of the first member 181 to support the D-cut surface 182c' of the protruding portion 182c of the second member 182.

The coupling member 184a may refer to a headless bolt having a screw tap 184a' on one end thereof.

The coupling member 184a may be inserted through the first coupling holes 181a and 183a, and located such that the screw tap 184a' formed on the coupling member 184a is engaged with the screw tap formed on the inner surface of the first coupling hole 183a of the bushing 183. In this case, even when a temperature rises due to the operation of the rotary engine 100, the coupling member 184a may be prevented from being protruded or separated to the outside due to thermal expansion. In addition, deviation of concentricity of the crankshaft 180 can be minimized owing to the insertion of the coupling member 184*a* and the separation of the coupling member 184*a* can be prevented owing to the screw-coupling.

The other coupling member 184*b* may be inserted through the support hole 181*b* formed on the first member 181 and the support hole 183*b* formed on the bushing 183, so that one end of the coupling member 184*b* can support the D-cut surface 182*c*' of the protruding portion 182*c* of the second member 182.

Since the crankshaft 180 is subjected to a stable movement and the first member 181 and the second member 182 can have a strong coupling structure by use of the coupling members 184*a* and 184*b* and the bushing 183, distortion of the crankshaft 180 and a spacing between the coupling surfaces of the first member 181 and the second member 182 can be prevented although the crankshaft rotates at high rpm. Accordingly, as illustrated in FIG. 9, the rotor 120 does not move in the left-right direction in spite of the operation of the rotary engine 100, and thus may not be brought into contact with the intake-side cover 141 and the exhaust-side cover 142 provided at both sides of the rotor 120.

In addition, the rotor 120 can obtain improved durability by avoiding unnecessary abrasion, and an operating speed of the crankshaft 180 can be increased up to speed (up to 2500 rpm) higher than the existing operating speed owing to reduced deformation of the crankshaft 180.

The foregoing embodiments are merely given of those embodiments for practicing a rotary engine according to the present disclosure. Therefore, the present disclosure is not limited to the above-described embodiments, and it will be understood by those of ordinary skill in the art that various changes in form and details may be made therein without departing from the scope of the present disclosure.

What is claimed is:

1. A rotary engine, comprising:
a housing that defines a plurality of accommodating portions and that defines a plurality of combustion chambers configured to communicate with the plurality of accommodating portions, respectively;
a rotor that is configured to rotate about an axis that is eccentric with respect to a center of each accommodating portion, the rotor having a plurality of lobes configured to insert to one or more of the plurality of accommodating portions, wherein a number of the plurality of lobes is less than a number of the plurality of accommodating portions;
housing covers that are coupled to ends of the housing, respectively, and that are configured to cover the plurality of accommodating portions to define a closed space in each accommodating portion;
a crankshaft that penetrates through the rotor and that is configured to receive rotational force from the rotor, the crankshaft comprising:
a first member that defines an insertion groove recessed from a side surface of the first member,
a second member that extends through a center portion of the housing, the second member including a protruding portion located at an end of the second member and configured to insert into the insertion groove of the first member, and
a coupling member that is located at a position where the insertion groove and the protruding portion overlap each other and that is configured to couple the first member to the second member; and
a bushing that has a shape corresponding to an inner surface of the insertion groove, that is configured to insert into the insertion groove, and that is positioned between the protruding portion and the insertion groove.

2. The rotary engine of claim 1, wherein the insertion groove of the first member is offset from a center axis of the first member.

3. The rotary engine of claim 1, wherein the insertion groove of the first member is offset from a center axis of the first member.

4. The rotary engine of claim 1, wherein a rotational speed of the crankshaft is between 200 revolutions per minute (rpm) and 2500 rpm.

5. The rotary engine of claim 1, wherein each of the first and second members of the crankshaft has a hollow cylindered shape.

6. The rotary engine of claim 1, wherein the first member and the coupling member are located outside of the rotor, and
wherein the second member penetrates through the rotor and is configured to couple to the rotor to receive rotational force from the rotor.

7. The rotary engine of claim 1, wherein at least a portion of an outer surface of the protruding portion includes a flat surface.

8. The rotary engine of claim 7, wherein the outer surface of the protruding portion further includes a round surface that extends from the flat surface, the flat surface being configured to restrict relative movement of the second member with respect to the first member.

9. The rotary engine of claim 1, wherein the number of the plurality of accommodating portions is greater than or equal to three.

10. The rotary engine of claim 9, wherein the number of the plurality of lobes is less than the number of the plurality of accommodating portions by one.

11. The rotary engine of claim 1, wherein the second member comprises:
an eccentric portion that extends to a first end of the second member and that is configured to couple to the insertion groove, a rotational axis of the eccentric portion being offset from a center axis of the first member, and
a supporting portion that extends from the eccentric portion to a second end of the second member, a rotational axis of the supporting portion being coaxial with the center axis of the first member.

12. The rotary engine of claim 11, wherein the eccentric portion of the second member passes through the rotor in a first direction, and
wherein the support portion of the second member is located outside of the rotor and protrudes from a first side surface of the rotor.

13. The rotary engine of claim 1, wherein an inner circumferential surface of the bushing is configured to contact an outer surface of the protruding portion, and
wherein the inner circumferential surface of the bushing includes a flat portion configured to restrict relative movement of the second member with respect to the first member.

14. The rotary engine of claim 13, wherein the inner circumferential surface of the bushing further includes a curved portion that extends from the flat portion and that is configured to contact the outer surface of the protruding portion.

15. The rotary engine of claim 14, wherein the protruding portion of the second member includes a round portion configured to contact the curved portion of the bushing.

16. The rotary engine of claim 1, wherein the first member defines a first coupling hole at an outer circumferential surface of the first member, the first coupling hole extending to the insertion groove of the first member, wherein the protruding portion of the second member defines a second coupling hole that extends toward a center portion of the protruding portion, and wherein the first coupling hole and the second coupling hole are configured to overlap each other based on the first member coupling to the second member.

17. The rotary engine of claim 16, wherein the coupling member is configured to insert into the first coupling hole and the second coupling hole.

18. The rotary engine of claim 16, wherein the first coupling hole comprises a plurality of first coupling holes, and wherein the second coupling hole comprises a plurality of second coupling holes that are configured to overlap the plurality of first coupling holes, respectively, based on the first member coupling to the second member.

19. The rotary engine of claim 18, wherein the first member further defines a support hole located at the outer circumferential surface of the first member and spaced apart from the plurality of first coupling holes, and wherein the coupling member is configured to insert to the support hole and to support an outer surface of the protruding portion.

\* \* \* \* \*